(12) United States Patent
Bae et al.

(10) Patent No.: US 8,156,008 B2
(45) Date of Patent: Apr. 10, 2012

(54) SYSTEM AND METHOD FOR INFORMATION PROVIDER COMMUNICATION WITH INFORMATION REQUESTER

(75) Inventors: Ku Young Bae, Seoul (KR); Kim Moo Seong, Pusan (KR)

(73) Assignee: Ebay Korea Co., Ltd., Seoul (KR)

( * ) Notice: Subject to any disclaimer, the term of this patent is extended or adjusted under 35 U.S.C. 154(b) by 1143 days.

(21) Appl. No.: 11/275,866

(22) Filed: Feb. 1, 2006

(65) Prior Publication Data
US 2006/0287929 A1 Dec. 21, 2006

(30) Foreign Application Priority Data
Jun. 7, 2005 (KR) .................... 10-2005-0048496

(51) Int. Cl.
*G06Q 30/00* (2006.01)
(52) U.S. Cl. ..................... 705/26.1; 709/225
(58) Field of Classification Search ............... 705/26, 705/27; 709/205, 225; 703/6; 707/6; 379/198; 370/401
See application file for complete search history.

(56) References Cited

U.S. PATENT DOCUMENTS

| | | | |
|---|---|---|---|
| 5,454,033 A * | 9/1995 | Hahn et al. ............... | 379/198 |
| 6,263,066 B1 * | 7/2001 | Shtivelman et al. ...... | 379/266.06 |
| 6,295,551 B1 * | 9/2001 | Roberts et al. ............ | 709/205 |
| 6,345,239 B1 * | 2/2002 | Bowman-Amuah ....... | 703/6 |
| 6,430,604 B1 | 8/2002 | Ogle et al. | |
| 6,665,395 B1 * | 12/2003 | Busey et al. .............. | 379/265.09 |
| 7,382,773 B2 * | 6/2008 | Schoeneberger et al. .. | 370/353 |
| 2004/0141508 A1 * | 7/2004 | Schoeneberger et al. .. | 370/401 |
| 2005/0144279 A1 * | 6/2005 | Wexelblat .................. | 709/225 |
| 2006/0167871 A1 * | 7/2006 | Sorenson et al. .......... | 707/6 |

FOREIGN PATENT DOCUMENTS

| | | |
|---|---|---|
| JP | 2001-265977 A | 9/2001 |
| JP | 2002-074083 A | 3/2002 |
| JP | 2002-108794 A | 4/2002 |
| JP | 2003-316944 A | 11/2003 |
| WO | 0105115 A2 | 1/2001 |
| WO | WO 0105115 A2 * | 1/2001 |

OTHER PUBLICATIONS

"BayPackets Expands Its IMS Offering to Deliver Fixed Mobile Convergence; Company Announces General Availability of Parlay/OSA Gateway and Advanced Call Center Application," Business Wire, New York: Jun. 7, 2005, p. 1.*
Japanese Patent Office, Japanese Office Action issued in corresponding JP Application No. 2006-023802, dated Jun. 14, 2011.

* cited by examiner

*Primary Examiner* — Yogesh C Garg
*Assistant Examiner* — Anne Georgalas
(74) *Attorney, Agent, or Firm* — Sughrue Mion, PLLC

(57) ABSTRACT

The present invention provides a system and a method for an information provider communicating with an information requester. The system includes a messenger server for managing instant messaging, identifying whether the information provider registers a timing available for communication, priority sequence of communication channel and communication means, searching communication means available for communication promptly connecting the communication means of the information provider from a higher priority to a lower priority sequentially; a proxy server, coupled to the messenger server, receiving a signal from the messenger server and deciding a communication channel to process this signal and transmitting a call; a redirect server administrating the position of the information requester and the information provider logged in the messenger server, based on Internet Protocol; and a VOIP gateway providing the internet telephone network services to which a personal computer terminal or a phone is connected.

13 Claims, 9 Drawing Sheets

Fig. 2a

| GOODS DATABASE |
|---|
| GOODS ADMINISTRATION 2111 |
| GOODS NAME 2112 |
| GOODS CATEGORY 2113 |
| GOODS CLASS 2114 |
| MARKET PRICE 2115 |
| SHOPPING PRICE 2116 |
| MANUFACTURE COMPANY 2117 |
| BRAND 2118 |
| ORIGINAL PRODUCTION PLACE 2119 |
| GOODS CHARACTERISTIC 2120 |
| DETAILED DESCRIPTION ON GOODS 2121 |
| IMAGE FILE 2122 |
| DELIVERY METHOD 2123 |
| DELIVERY CHARGE 2124 |
| TERM OF NON INTEREST PAYMENT 2125 |
| COUPON 2126 |
| GIFT 2127 |
| RANK POINT 2128 |
| DEALER INFORMATION 2129 |
| INNOVATOR INFORMATION 2130 |

Fig. 2b

| DEALER DATABASE |
| --- |
| DEALER ID 2211 |
| DEALER NAME 2212 |
| TELEPHONE NUMBER 2213 |
| MOBILE NUMBER 2214 |
| FAX NUMBER 2215 |
| TAX ACCOUNT ISSUE 2216 |
| RECEIPT ISSUE 2217 |
| DEALER INDTRODUCTION 2218 |
| MINI SHOP LOGO 2219 |
| CUSTOMER EVALUATION CLASSIFICATION 2220 |
| MARKETING GOODS 2221 |
| LOG IN INFORMATION 2222 |
| VOICE CHATTING INFORMATION 2223 |
| CAMERA CHATTING INFORMATION 2224 |
| VOICE COMMUNICATION INFORMATION 2225 |
| REAL TIME COMMUNICATION APPLICATION 2226 |
| TIMING AVAILABLE FOR COMMUNICATION, COMMUNICATION CHANNEL PRIORITY AND COMMUNICATION MEANS 2227 |

Fig. 2c

| ORDER DATABASE |
|---|
| SHOPPING CART NUMBER 2311 |
| CONTRACT NUMBER 2312 |
| CONTRACT DATE 2313 |
| GOODS INFORMATION 2314 |
| GOODS QUANTITY 2315 |
| SETTLEMENT FUND 2316 |
| SETTLEMENT STATUS 2317 |
| DELIVERY CHARGE 2318 |
| SETTLEMENT MEANS 2319 |
| BANK NAME 2320 |
| RECEIPTOR 2321 |
| RECEIPTOR TELEPHONE 2322 |
| RECEIPTOR MOBILE PHONE 2323 |
| DELIVERY ADDRESS 2324 |

Fig. 2d

| CUSTOMER DATABASE |
|---|
| CUSTOMER NAME 2411 |
| CUSTOMER ID 2412 |
| BIRTH YEAR AND DATE 2413 |
| TELEPHONE NUMBER 2414 |
| MOBILE PHONE NUMBER 2415 |
| ADDRESS 2416 |
| PURCHASING GOODS INFORMATION 2417 |
| PURCHASING DATE 2418 |
| LOG IN INFORMATION 2419 |
| INNOVATOR REGISTRATION 2420 |
| TIMING AVAILABLE FOR COMMUNICATION, COMMUNICATION CHANNEL PRIORITY AND COMMUNICATION MEANS 2421 |
| EVALUATION INFORMATION 2422 |

Fig. 2e

| COMMUNICATION RESULTS DATABASE |
|---|
| COMMUNICATION PARTNER ID 2511 |
| GOODS INFORMATION 2512 |
| TIMING AVAILABLE FOR COMMUNICATION, COMMUNICATION CHANNEL PRIORITY AND COMMUNICATION MEANS 2513 |
| COMMUNICATING CUSTOMER INFORMATION 2514 |
| COMMUNICATION FULFILLMENT 2515 |
| REWARD INFORMATION 2516 |
| CONNECTION BLOCKING LIST 2517 |
| CONNECTION RESTRICTION LIST AND PERIOD 2518 |

US 8,156,008 B2

SYSTEM AND METHOD FOR INFORMATION PROVIDER COMMUNICATION WITH INFORMATION REQUESTER

BACKGROUND OF THE INVENTION

The present invention relates to a system and a method for an information provider communicating with an information requester, more particularly on-line shopping mall or on-line portal site, which provides trading environments between a plurality of purchaser and a plurality of merchant on on-line network, communication with customers, that is, Business to Customer (B to C), Business to Business (B to B) etc.

As internet users are increased rapidly, information requests on goods or services are expanded swiftly. Since it is necessary for people to use the internet in daily life, there are a number of e-market places installed on the internet as an example of e-trading platform. A number of merchants or e-dealers register and sell goods through the e-market places and a number of customers connect to the e-market places and search the information on the registered goods and services to purchase these registered goods and services.

If the customers have questions on the information for goods to buy, they should find out the information on goods in web sites or blogs etc., refer to Frequently Asked Questions (FAQ) in these e-market places, or send an e-mail to a dealer or an operator of these e-market places. However, since these web site, blogs or FAQ only include general information about the goods, the customers have difficulty in acquiring correct answers. Also, in case of e-mail, the customers have to wait for an answer from the dealer or the operator for a long time. These problems arise in a portal web site or an on-line shopping mall.

SUMMARY OF THE INVENTION

The present invention provides a system and a method for an information provider communicating with an information requester which improves over the prior art. In particular, the information requester can easily have a communication with the information provider when searching or shopping goods.

In an embodiment, the present invention provides a system for an information provider communicating with an information requester comprising a messenger server for managing instant messaging, identifying whether the information provider registers a timing available for communication, priority sequence of communication channel and communication means, searching communication means available for communication promptly connecting the communication means of the information provider from a higher priority to a lower priority sequentially; a proxy server, coupled to the messenger server, receiving a signal from the messenger server and deciding a communication channel to process this signal and transmitting a call; a redirect server administrating the position of the information requester and the information provider logged in the messenger server, based on Internet Protocol; and a VOIP gateway providing the internet telephone network services to which a personal computer terminal or a phone is connected.

In another embodiment, the present invention provides a method for an information provider communicating with an information requester comprising steps of searching communication means available for communication promptly from a database including information on timing available for communication, priority sequence of communication channel and communication means; switching communication means of the information provider from a higher priority to a lower priority sequentially, if the information requester requests a call with the information provider; communicating with the information requester, if the information provider responds to the call; and transmitting an automated message to the information requester, if the information provider is unable to respond to the call.

BRIEF DESCRIPTION OF THE DRAWINGS

The above and other features, objects and advantages of the present invention will be better understood from the following detailed description of the invention when read in conjunction with the accompanying drawings in which:

FIG. 2a is a block diagram of a database field for goods in the system according to an embodiment of the present invention;

FIG. 2b is a block diagram of a database field for dealers in the system according to an embodiment of the present invention;

FIG. 2c is a block diagram of a database field for orders in the system according to an embodiment of the present invention;

FIG. 2d is a block diagram of a database field for buyers in the system according to an embodiment of the present invention;

FIG. 2e is a block diagram of a database field for communications results in the system according to an embodiment of the present invention;

DETAILED DESCRIPTION OF THE EMBODIMENTS

Figure 1:
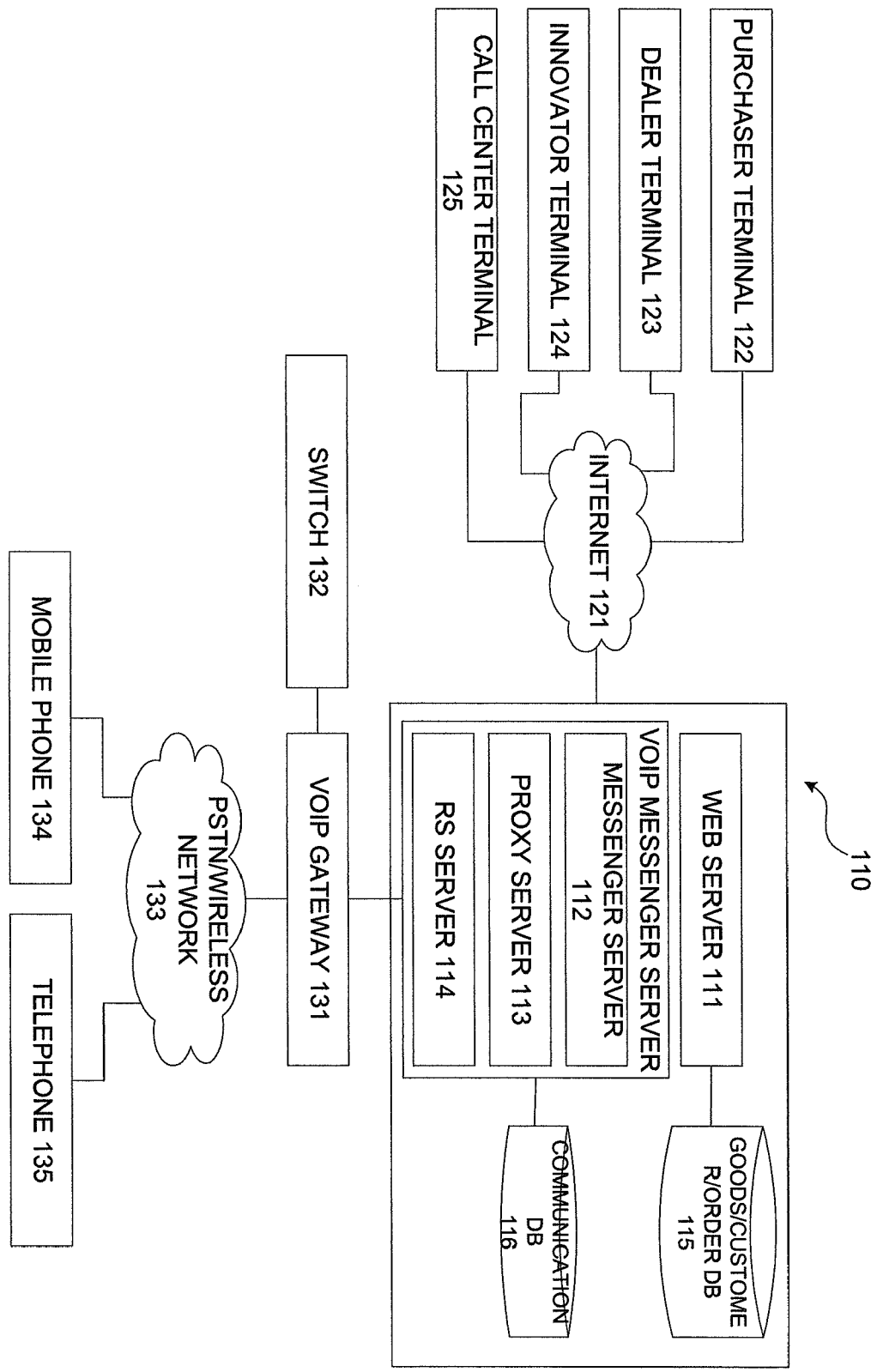
FIG. 1 is a schematic view of a system for an information provider communicating with an information requester according to an embodiment of the present invention.

FIG. 1 is a schematic view of a system for an information provider communicating with an information requester according to an embodiment of the present invention. As shown in FIG. 1, the communication system 110 is connected to a plurality of purchaser terminal 122 for an information requester, a plurality of dealer terminal 123, a plurality of innovator terminal 124 and a plurality of call center terminal 125 for an information provider. However, for ease of understanding and clarity, the following description may refer to one terminal. As used herein "information requester" may be not only a customer who searches and finds out the information for goods or services or a purchaser who wishes to buy or bought goods or services, but also a dealer in Business to Business. In order to describe an embodiment of the present invention, hereinafter the information requester may be referred to as the customer or purchaser who wishes to buy or bought goods or services. Also, the information provider may be referred to as the dealer who sells goods or services or an innovator who bought goods or services and then gives his/her opinion on goods or services to be compensated for his/ her effort from a web server operator. In FIG. 1, each purchaser terminal 122, dealer terminal 123, an innovator terminal 124 and call center terminal 125 actually has a plurality of terminals.

The communication system 110 includes a web server 111, a messenger server 112, a proxy server 113, and a redirect server 114. A goods/client/order database 115 is connected to the web server 111. A VOIP (Voice Over Internet Protocol) messenger server may include the messenger server 112, the proxy server 113 and the redirect server 114. A VOIP server may include the proxy server 113 and the redirect server 114. The VOIP messenger server is connected to a communication results database 116 and a VOIP gateway.

The VOIP gateway 131 is connected to a call center (not shown in Figs.) through a switch 132, which changes a type of communication network, e.g., Public Switched Telephone Network (PSTN) or mobile communication networks. Therefore, the customers can be connected to the dealer or the innovator by a mobile phone 134 or a telephone 135.

A web server 111 usually operates an e-commerce web site, in which a plurality of dealers sell a variety of goods or services and a plurality of customers buy these goods or services. The web server 111 provides purchasing procedures of registration, search, order, refund, and delivery confirmation for these goods or services, executes a messenger program between the information requester and the information provider, and sends hypertext markup language (HTML) message showing additional information on goods/customer/order etc. in the messenger program to the messenger server 112.

The messenger server 112 manages instant messaging, the communication partner and group of each customer or user verification, and therefore provides the function of messaging between the information requester and the information provider through the messenger program.

The proxy server 113 connected to the messenger server 112 receives a signal from the messenger server 112, decides a communication channel to process this signal and transmits a call and a message. The redirect server 114 administrates (stores, deletes, or corrects etc.) the position of the customer, the dealer and the innovator logged in the messenger server 112, based on Internet Protocol (IP) address.

The proxy server 113 records communication timing and period between the information requester and the information provider, the communication results of the information provider evaluated by the information requester who communicated with the information provider. Also, the proxy server 113 evaluates the information requester and the information provider based on these communication results, sets up a blacklist of connection blocking and connection period restriction. If the information requester or the information provider is registered in the connection blocking list, the proxy server 113 should block the information provider communication with the information requester, and if the information requester or the information provider is registered in the connection period restriction list, the proxy server 113 should permit the information provider communication with the information requester for a permitted period. Therefore, based on the evaluation results, the proxy server 113 decides whether to connect a voice call or not and a communicating period.

The goods/client/order database 115 includes a goods database holding information on these goods, a dealer database holding information on the dealer, a purchaser database holding information on the customer, especially a purchaser and an order database holding information on the order related information. The communication results database 116 includes the communication results among the dealer, the innovator and the customer.

The VOIP gateway 131 provides the internet telephone network services, more specifically voice or camera chatting by personal computer to personal computer (PC to PC), PC to internet protocol (IP) phone, or PC to telephone etc.

Referring to FIGS. 2a to 2e, the goods database, the dealer database, the order database, the purchaser database and the communication results database will be described in detail below.

As illustrated in FIG. 2a, to hold and administrate information on the goods traded in the web server, the goods database includes a goods administration field 2111, a goods name field 2112, a goods category field 2113, a goods class field 2114, a market price field 2115, a shopping price field 2116, a manufacture company field 2117, a brand field 2118, a original production place field 2119, a goods characteristic field 2120, a detailed description field on goods 2121, an image file field 2122, a delivery method field 2123, a delivery charge field 2124, a term of non interest payment field 2125, a coupon field 2126, a gift field 2127, a rank point field 2128, a dealer information field 2129, an innovator information field 2130. A unique administration number for each goods is designated in the goods administration field 2111, a position of a dealer database is recorded in the dealer information field 2129, and a position of the innovator for each goods is recorded in the innovator information field 2130.

As illustrated in FIG. 2b, to hold and administrate information on the dealer marketing goods in the web server, the dealer database includes a dealer identification field 2211, a dealer name field 2212, a telephone number field 2213, a mobile phone number field 2214, a fax number field 2215, a tax account issue field 2216, a receipt issue field 2217, a dealer introduction field 2218, a mini shop logo field 2219, a customer evaluation classification field 2220, a marketing goods field 2221, a log in information in the dealer field 2222, a voice chatting field 2223, a camera chatting field 2224, a voice communication information field 2225, a real time communication application field 2226, a timing available for communication, priority sequence of communication channel and communication means field 2227. Information on each goods marketed by the dealer is recorded in the marketing goods field 2221. The communication means (for example, message chatting, voice chatting, camera chatting through the messenger program, mobile phone, and telephone), the priority sequence of communication channel, and the timing schedule for communication, which are input by the dealer, are recorded in the timing available for communication, priority sequence of communication channel and communication means field 2227. Also, whether the dealer logs in now or not is recorded in the log in information field 2222 and whether the dealer could communicate with the customer or not by each communication means is recorded in the voice chatting field 2223, the camera chatting field 2224, and the voice communication information field 2225 respectively.

As illustrated in FIG. 2c, the order database includes a shopping cart number field 2311, a contract number field 2312, contract date field 2313, a goods information field 2314, a goods quantity field 2315, a settlement fund field 2316, a settlement status field 2317, a delivery charge field 2318, a settlement means field 2319, a bank name field 2320, a recipient field 2321, a recipient telephone field 2322, a recipient mobile phone field 2323, and a delivery address field 2324 etc.

As illustrated in FIG. 2d, the purchaser database includes a customer name field 2411, a customer identification field 2412, a birth year and date field 2413, a telephone field 2414, a mobile phone field 2415, an address field 2416, a purchasing goods field 2417, a purchasing date field 2418, a log in information on the customer 2419, an innovator registration of the purchasing goods field 2420, a timing available for communication, sequence of communication channel and communication means field 2421, and an evaluation information on the customer field 2422. The goods which the purchaser bought are recorded in the purchasing goods field 2417. The communication means (for example, message chatting, voice chatting, camera chatting through the messenger program, mobile phone, and telephone), the sequence of communication channel, and the timing schedule for communication, which are input by the innovator, are recorded in the timing available for communication, priority sequence of communication channel and communication means field 2421.

As illustrated in FIG. 2e, the communication results database includes a communication partner identification out of the dealer or the innovator 2511, a purchasing or innovating goods information field 2512, a timing available for communication, priority sequence of communication channel and communication means field 2513, a communicating customer information 2514, a communication fulfillment (start and end timing of a call) field 2515, and a reward information field 2516. Also, the communication results database includes a connection blocking list field 2517, a connection restriction period and list field 2518.

Figure 3:
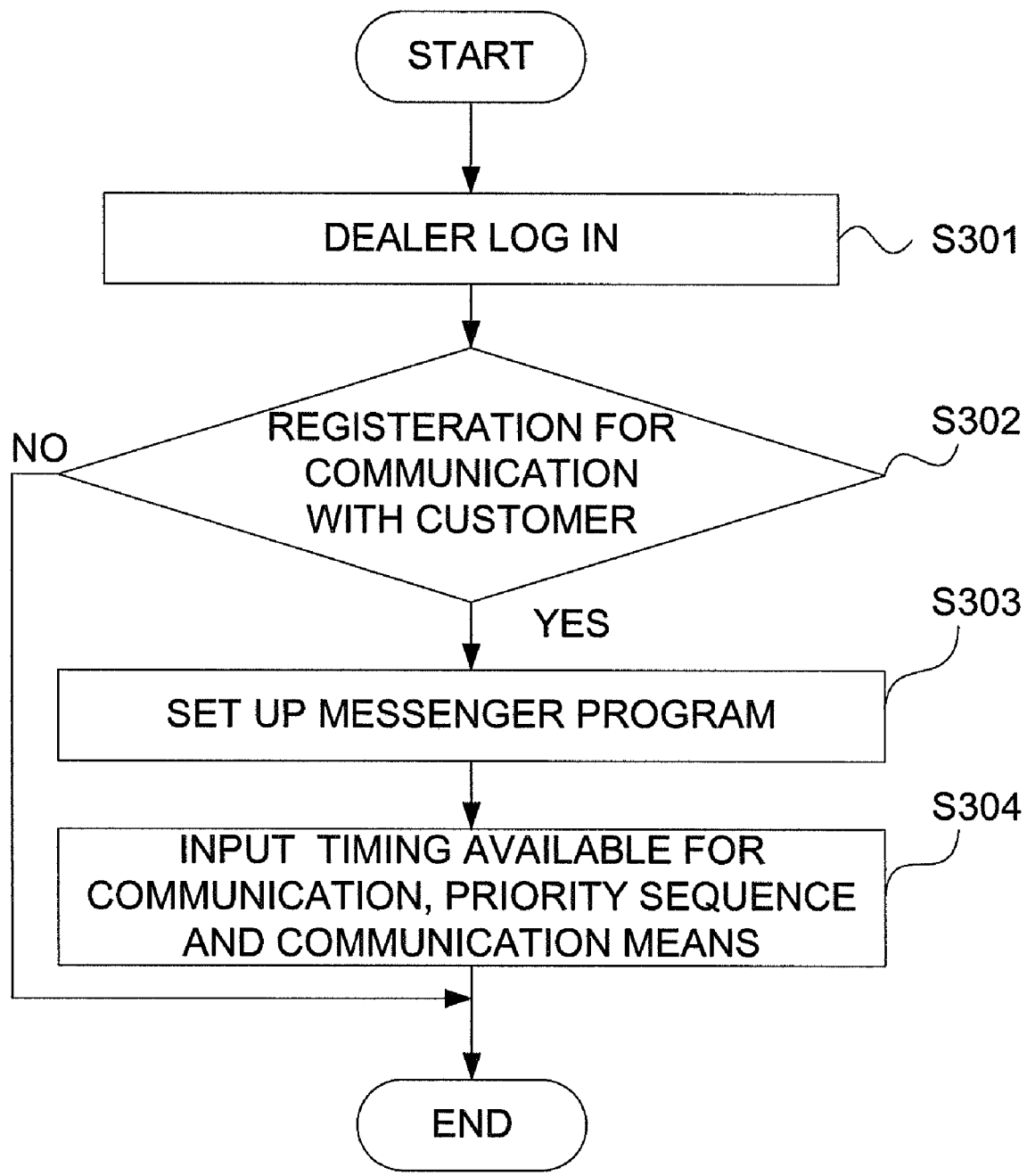
FIG. 3 is a flow chart of the steps for registering communication means to communicate with customers in real time in a method for an information provider communicating with an information requester according to an embodiment of the present invention.
Figure 4:
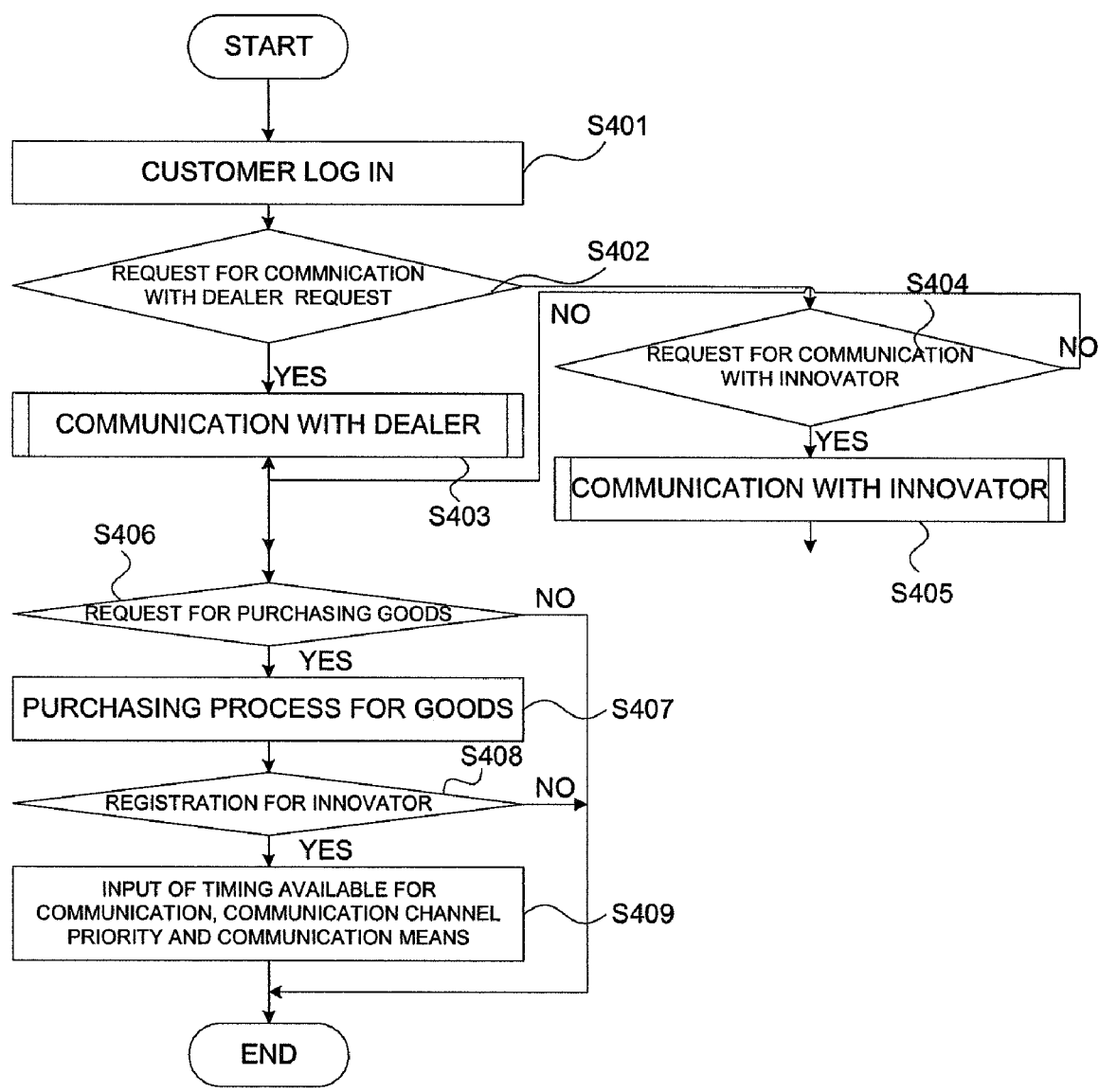
FIG. 4 is a flow chart of the steps for asking information on goods to buy and purchasing the goods in the method according to an embodiment of the present invention.
Figure 5:
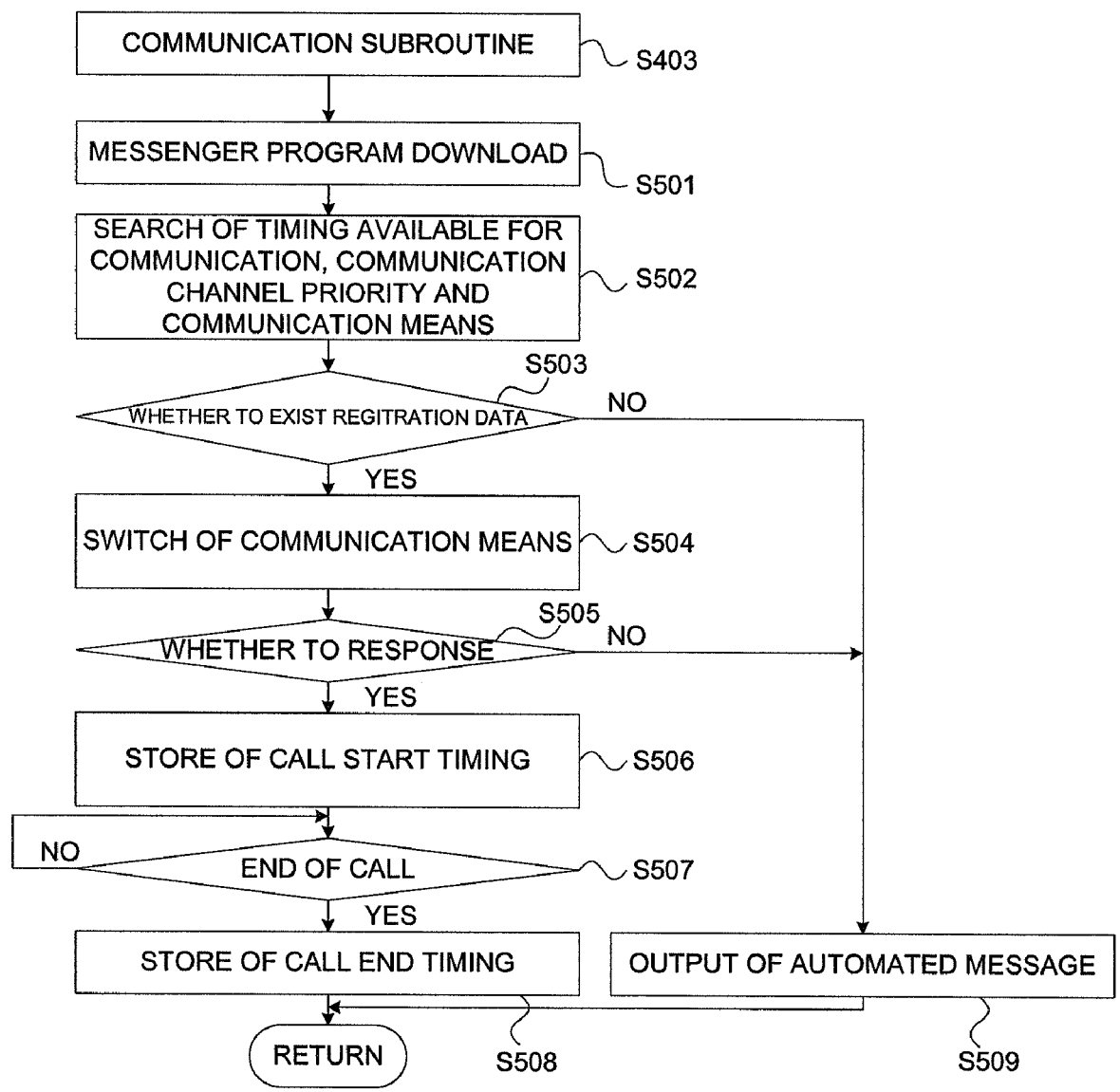
FIG. 5 is a flow chart of a subroutine for communicating with a dealer in FIG. 4.
Figure 6:
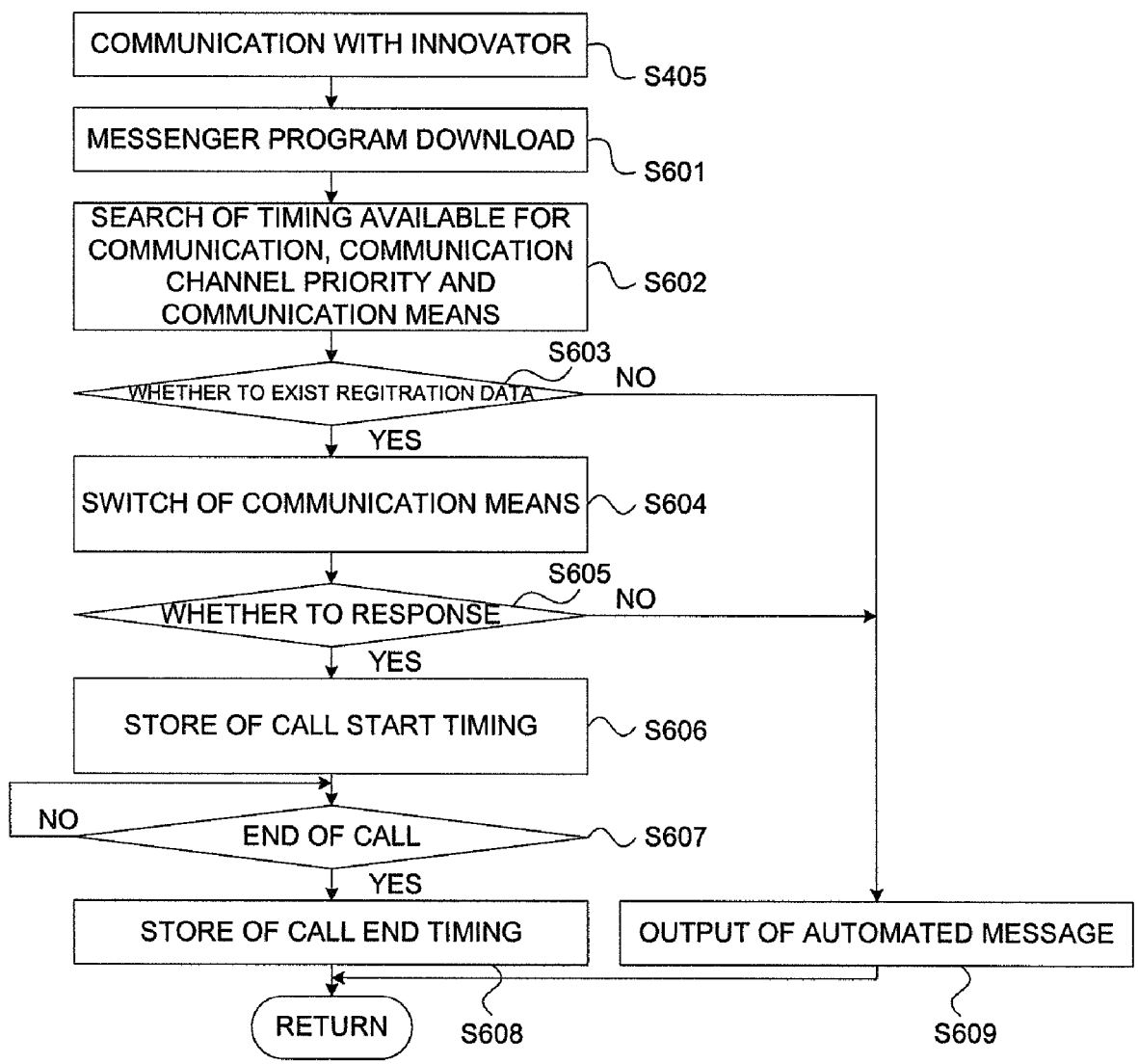
FIG. 6 is a flow chart of a subroutine for communicating with an innovator in FIG. 4.

FIGS. 3 to 6 are flow charts illustrating a method for an information provider communicating with an information requester according to an embodiment of the present invention. FIG. 3 is a flow chart of the steps for registering communication means to communicate with customers in real time in a method for an information provider communicating with information requester according to an embodiment of the present invention. FIG. 4 is a flow chart of the steps for asking information on goods to buy and purchasing the goods in the method according to an embodiment of the present invention. FIG. 5 is a flow chart of a subroutine for communicating with a dealer in FIG. 4. FIG. 6 is a flow chart of a subroutine for communicating with an innovator in FIG. 4.

Referring to FIG. 3, to answer the customer's question in real time, steps for registering a communication means, priority sequence etc. will be described in detail below. The dealer logs in web site on web server S301 and requests the registration of real time communication with the customer S302, and the web server downloads and sets up the messenger program in the dealer terminal S303. Also, the web server executes the messenger program and then the messenger server stores data or information on the timing available for communication, priority sequence of communication channel and communication means, which the dealer inputs through the messenger program in the database S304. The communication means includes the internet protocol phone, the telephone, the mobile phone, and a satellite telephone etc., and more than two types of the communication means can be registered at one time. The means, priority sequence and timing available for communication may be also registered in the database via the web server at a dealer exclusive use program or e-commerce web site. This messenger program backs up switching to the call center and multi-chatting by message, voice, or camera etc. technically.

Each dealer usually registers whether to communicate with the customer in real time in the e-marketplace which intermediates between the dealers and the customers, however, each operator or administrator of the e-marketplace can also register whether to communicate with the customer in real time in e-commerce web site.

Referring to FIG. 4, steps for questioning the dealer and purchasing goods will be described in detail below. The customer connects to the web server, logs in the web site S401 and searches goods a usual search procedures. If the customer selects specific goods, the detailed image view of the selected goods in the purchaser terminal is shown up in the purchaser terminal. The detailed image view includes information on the selected goods, the dealer and the innovator etc. The information on the dealer may include whether to register the communication with the customer in real time or not. The information on the innovator may also include the registered innovator identification, the purchasing date of the selected goods and the evaluation information on the innovator.

If the customer questions on the selected goods through the communication with the dealer or the innovator, the customer can request a call. The customer in FIG. 4 can be not only the purchaser who wishes to buy or bought the selected goods, but also a purchaser who wishes to communicate with the dealer or the innovator in order to question how to use the selected purchasing goods If the customer requests the communication with the dealer S402, the proxy server executes a communication subroutine with the dealer S403. If the customer requests the communication with the innovator S404, the proxy server executes a communication subroutine with the innovator S405. The communication subroutine with the dealer S403 and the communication subroutine with the innovator S405 will be described in detail in later, referring to FIGS. 5 and 6.

If the customer orders a purchase on the selected goods irrespective of whether to request the communication with the dealer or the innovator or not S406, the web server should proceed to a step for selling the selected goods S407. And then the web server receives information on the purchaser and the delivery address and proceeds to a step for delivering the selected goods after settling accounts by various settlement means.

If the customer who purchased and used the selected goods wishes to register with an innovator through the web site or the messenger program S408, the messenger server receives and stores the means, priority sequence and timing available for communication with another customer in the database S409. The step for inputting the means, priority sequence and timing available for communication of the innovator is similar to that of the dealer. Although the purchaser can register with the innovator on the spot after buying the selected goods as illustrated in FIG. 4, the web server may establish a restriction in order to register with the innovator after using the purchasing goods for a predetermined period.

Referring to FIGS. 5, the communication subroutine S403 with the dealer will be described below. If the customer requests a communication with the dealer, the web server should detect whether the messenger program is established in the purchaser terminal or not and download the messenger program in the purchaser terminal when not established S501. If the messenger program is established in the purchase terminal, the messenger server should identify whether the dealer registers the timing available for communication, priority sequence of communication channel and communication means and search communication means available for communication promptly S502. If the communication means available promptly exist in the registration data S503, the messenger server should switch the communication means of the dealer through the proxy server from a higher priority to a lower priority sequentially S504.

If the dealer registers a plurality of internet phones in S504, the proxy server should route the call after detecting whether each phone is busy or available or not and display the status of the internet phones on the web page of the web site through the web server or the messenger view of the messenger program through the messenger server. If the dealer responds to the call S505, the web server or the messenger server should store the start timing for the call in the database S506. If the call is ended S507, the web server or the messenger server should store the end timing for the call and the communication results of the dealer in the database S508. Meanwhile, if the dealer doesn't register the timing available for communication, priority sequence of communication channel and communication means, the communication means available promptly don't exist in the registration data in S503, or the dealer is unable to respond to the call because of including the blocking list or no accessibility to the communication means in S505, the web server should transmit an automated message to the customer S509.

Also, the proxy server evaluates attitude, communication timing and period between the dealer and the customer based on the communication results and administrates the blacklist of connection blocking and connection period restriction. If the dealer or the customer is registered in the connection blocking list, the proxy server should block the dealer communication with the customer, and if the dealer or the customer is registered in the connection period restriction list, the proxy server should permit the dealer communication with the customer for a permitted period.

Referring to FIGS. 6, the communication subroutine S405 with the innovator will be described below. If the customer requests a communication with the innovator, the web server should detect whether the messenger program is established in the purchaser terminal or not and download the messenger program in the purchaser terminal when not established S601. If the messenger program is established in the purchase terminal, the messenger server should identify whether the innovator registers the timing available for communication, priority sequence of communication channel and communication means and search communication means available for communication promptly S602. If the communication means available promptly exist in the registration data S603, the messenger server should switch the communication means of the innovator through the proxy server from a higher priority to a lower priority sequentially S604.

If the innovator responds to the call S605, the web server or the messenger server should store the start timing for the call in the database S606. If the call is ended S607, the web server or the messenger server should store the end timing for the call and the communication results of the dealer in the database S608. Meanwhile, if the communication means available promptly don't exist in the registration data in S603, or the dealer is unable to respond to the call because of including the blocking list or no accessibility to the communication means in S605, the web server should transmit an automated message to the customer S609.

Also, the proxy server evaluates attitude, communication timing and period between the dealer and the customer based on the communication results and administrates the blacklist of connection blocking and connection period restriction. If the dealer or the customer is registered in the connection blocking list, the proxy server should block the dealer communication with the customer, and if the dealer or the customer is registered in the connection period restriction list, the proxy server should permit the dealer communication with the customer for a permitted period.

The customer can evaluate the purchasing goods, the consulting contents of the dealer or the innovator after communicating with them or purchasing the selected goods and the evaluation results is stored in each database and provided to other customer.

The image view and information on goods which the customer wishes to buy or bought may be displayed on the messenger view of the messenger program, and a click button which is directly connected to the call center may be displayed on the messenger view of the messenger program.

Also, the messenger program can provide the chatting environment that not only the customer requests a chatting with the dealer, but also the dealer selects the customer and chat with a plurality of customer.

An embodiment of the present invention described above is only for purpose of illustration and not limitation of the present invention. Therefore, it is understood that as far as it is not above the nature of the present invention, the embodiment shown and described above in FIGS. 1 to 6 will be also applied to the internet portal site or the contents providing site.

What is claimed is:

1. A system for an information provider communicating with an information requester comprising:
a messenger server which manages instant messaging, identifies, in a dealer database, a timing of availability of the information provider which indicates a time when the information provider is available for communication, a plurality of types of communication means available to the information provider and a predetermined priority order of communication means which indicates an order of switching between the plurality of types of communication means available to the information provider for making a connection to the information requester from a higher priority to a lower priority until the connection is made, wherein the timing of availability of the information provider, the plurality of types of communication means available to the information provider and the predetermined priority order of communication means are registered in the dealer database by the information provider prior to receiving a communication request by the information requester, and, upon receiving the communication request from the information requester, the messenger server sequentially searches the plurality of types of communication means available to the information provider registered in the dealer database from those of the higher priority to those of the lower priority for a corresponding communication means that matches a communication means of the information requester to make a connection between the information provider and the information requester;
a proxy server, coupled to the messenger server, which determines a communication channel for connecting the information provider to the information requester based on the corresponding communication means of the information provider, and connects the information provider and the information requester using the determined communication channel;
a redirect server, coupled to the messenger server, which administers information of a location of the information requester and the information provider recorded in the messenger server, based on Internet Protocol addresses, wherein the information of the location of the information requester and the information provider are used by the proxy server for determining the communication channel; and a Voice Over Internet Protocol (VOIP) gateway server, coupled to the messenger server, which provides internet telephone network services to which a personal computer terminal or a phone of the information requester is connected to the information provider, wherein the proxy server manages a connection blocking list and a connection period restriction list according to evaluation of the information requester and the information provider, wherein if the information requester or the information provider is registered in the connection blocking list, the proxy server immediately blocks communication between the information provider and the information requester, and if the information provider or the information requester is registered in the connection period restriction list, the proxy server will allow communication between the information provider and the information requester for only a permitted period of time, wherein the permitted period of time begins when the information provider is connected to the information requester by the proxy server, and the proxy server disconnects the information provider from the information requester when the permitted period of time expires during the communication between the information provider and the information requester.

2. A system according to claim 1 further comprising:
a web server administrating general purchasing procedures of registration, search, order, refund, and delivery confirmation for goods, and sending a message showing information on goods/customer/order to the messenger server.

3. A system according to claim 1 wherein the plurality of types of communication means is any one of an internet protocol phone, a telephone, a mobile phone, or a satellite telephone.

4. A system according to claim 3 wherein the proxy server routes the communication request after detecting whether each of a plurality of phones is available or not and displays a status of each of the plurality of phones on a web page through the web server or on a messenger view through the messenger server.

5. A system according to claim 1, wherein each of the messenger server, the proxy server and the redirect server comprise hardware.

6. A method for an information provider communicating with an information requester comprising steps of:
registering, by the information provider, in a dealer database information on a timing of availability of the information provider which indicates a time when the information provider is available for communication, a plurality of types of communication means available to the information provider, and a predetermined priority order of communication means which indicates an order of switching between the plurality of types of communication means available to the information provider for making a connection to the information requester from a higher priority to a lower priority until a match between the communication means of the information requester and a communication means of the information provider is made, wherein the information on a timing of availability of the information provider, the plurality of types of communication means available to the information provider and the predetermined priority order of communication means are registered in the dealer database by the information provider prior to receiving a communication request by the information requester;

upon the information requester requesting communication with the information provider, searching, by a messenger server, the plurality of types of communication means available to the information provider registered in the dealer database from those of the higher priority to those of the lower priority for a corresponding communication means that matches a communication means of the information requester to make a connection between the information provider and the information requester, wherein the searching comprises switching the communication means of the information provider from those of the higher priority to those of the lower priority, sequentially, until a corresponding communication means that matches a communication means of the information requester is made for making a connection between the information provider and the information requester;

communicating with the information requester, if the information provider responds to the communication request;

transmitting, by a web server, an automated message to the information requester notifying the information requester that the information provider is unable to respond to the communication request, if the information provider is unable to respond to the communication request; and managing, by a proxy server, a connection blocking list and a connection period restriction list according to evaluation of the information requester and the information provider;

wherein if the information requester or the information provider is registered in the connection blocking list, the proxy server immediately blocks communication between the information provider and the information requester and transmits an automated message to the information requester notifying the information requester that the information provider is unable to respond to the communication request, and, if the information provider or the information requester is registered in the connection period restriction list, the proxy server allows communication between the information provider and the information requester for only a permitted period of time, wherein the permitted period of time begins when the information provider is connected to the information requester by the proxy server, and the proxy server disconnects the information provider from the information requester when the permitted period of time expires during the communication between the information provider and the information requester.

7. A method according to claim 6 further comprising step of:
storing, by the messenger server, the at least one type of communication means, the priority sequence and the timing of availability of the information provider for communication with another information provider in the database.

8. A method according to claim 6 wherein the communication means is any one of an internet protocol phone, a telephone, a mobile phone, or a satellite telephone.

9. A method according to claim 6 wherein the communication request is routed after detecting whether each of the phones is available or not and the status of the phones is displayed on a web page or a messenger view.

10. A method according to claim 6 wherein the plurality of types of communication means is any one of an internet protocol phone, a telephone, a mobile phone, or a satellite telephone.

11. A method according to claim 6 wherein the communication means is a messenger program which switches between communication types including message, voice and image to a call center.

12. A method according to claim 6 wherein the information requester is any one of a customer who searches and finds out the information for goods, a purchaser who wishes to buy or bought goods, a dealer in Business to Business.

13. A method according to claim 6 wherein the information provider is a dealer or reviewer of goods or services.

* * * * *